United States Patent
Chiu

(10) Patent No.: US 10,177,669 B1
(45) Date of Patent: Jan. 8, 2019

(54) DUAL PHASE SHIFTED RESONANT CONVERTER WITHOUT ANY PHASE-LOCKED LOOP

(71) Applicant: Chicony Power Technology Co., Ltd., New Taipei (TW)

(72) Inventor: Huan-Chih Chiu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/807,193

(22) Filed: Nov. 8, 2017

(30) Foreign Application Priority Data

Oct. 11, 2017 (TW) .............................. 106134760 A

(51) Int. Cl.
H02M 3/335 (2006.01)
H02M 3/337 (2006.01)

(52) U.S. Cl.
CPC ..... H02M 3/33569 (2013.01); H02M 3/3376 (2013.01); *Y02B 70/1475* (2013.01)

(58) Field of Classification Search
CPC ...... H02M 3/335–3/42; Y02B 70/1433; Y02B 70/1475; Y02B 70/1491
See application file for complete search history.

(56) References Cited

U.S. PATENT DOCUMENTS

| 9,178,438 B2* | 11/2015 | Fu | H02M 3/33576 |
| 9,660,537 B1* | 5/2017 | Vinciarelli | H02M 7/219 |
| 2012/0033451 A1* | 2/2012 | Usui | H02M 1/4258 363/21.02 |
| 2015/0103564 A1* | 4/2015 | Duan | H02M 3/285 363/21.02 |

* cited by examiner

*Primary Examiner* — Gary L Laxton
*Assistant Examiner* — Peter M Novak
(74) *Attorney, Agent, or Firm* — Muncy, Geissler, Olds & Lowe, P.C.

(57) ABSTRACT

A resonant converter includes a first resonant conversion circuit, a second resonant conversion circuit, and a control unit. The first resonant conversion circuit has a first switch element and a second switch element, and the first switch element is ungrounded coupled to the second switch element and the second switch element is grounded. The second resonant conversion circuit has a third switch element and a fourth switch element, and the third switch element is ungrounded coupled to the fourth switch element and the fourth switch element is grounded. The control unit receives a feedback signal and controls the first resonant conversion circuit and the second resonant conversion circuit according to the feedback signal. Accordingly, it is to simplify circuit controls and increase the dynamic performance of phase controls.

8 Claims, 15 Drawing Sheets

DUAL PHASE SHIFTED RESONANT CONVERTER WITHOUT ANY PHASE-LOCKED LOOP

BACKGROUND OF THE INVENTION

Technical Field

The present disclosure relates to a power converter, and more particularly to a resonant converter.

Description of Related Art

In general, a resonant circuit has a transformer with a primary side and a secondary side, and the secondary side with a center tap provides two half windings. The two half windings are respectively coupled to a diode to form a full-wave rectifier to rectify a high-frequency sinusoidal wave at the primary side into constant-polarity (positive or negative) wave at the secondary side of the transformer. The rectifying circuit topology with "a center tapped transformer and two diodes" usually coordinates with two parallel-connected phase converters, and the phase converters are controlled by a 90-degree phase interleaving manner so as to achieve the effect of phase offset to each other and reduce output ripple of the resonant circuit.

The common solution is to additionally use a phase-locked loop (PLL). The PLL is used to provide phase controls for the two parallel-connected phase converters to implement the full-wave rectification with 90-degree phase interleaving. However, it is inevitable to increase control circuits and circuit costs since the PLL is additionally used. Moreover, if the phase control of the PLL is not accurate enough, namely the 90-degree phase interleaving cannot accurately control, it would lose the advantage of the phase offset to each other between the two phase converters.

Moreover, in order to achieve the energy saving in the light-loading condition of the resonant circuit, one of the parallel-connected phase converters is used to convert power and supply power to the load. In order words, if the two phase converters simultaneously operate in the light-loading condition, it would not reduce basic power consumption and fail to increase light-loading efficiency. In addition, when the phase converters coordinate with the PLL, it is difficult to maintain the phase synchronization between the two phase converters due to caused phase error once any one of the phase converters is decoupled in the light-loading condition, thereby significantly reducing the dynamic performance of phase calculation and phase control.

SUMMARY OF THE INVENTION

An object of the present disclosure is to provide a resonant converter to solve the problems of increased control circuits and costs, and reduced dynamic performance of phase calculation and phase control due to the introduced PLL. In order to achieve the above-mentioned objective, the resonant converter receives an input power source. The resonant converter includes a first resonant conversion circuit, a second resonant conversion circuit, a detection unit, an isolated transmission unit, and a control unit. The first resonant conversion circuit includes a first switching unit, a first resonant tank, and a first rectifying unit. The first switching unit includes a first switch element and a second switch element; the first switch element is ungrounded coupled between the input power source and the second switch element, and the second switch element is grounded. The first resonant tank is coupled in parallel to the second switch element. The first rectifying unit is coupled to the first resonant tank. The second resonant conversion circuit includes a second switching unit, a second resonant tank, and a second rectifying unit. The second switching unit includes a third switch element and a fourth switch element; the third switch element is ungrounded coupled between the input power source and the fourth switch element, and the fourth switch element is grounded. The second resonant tank is coupled in parallel to the third switch element. The second rectifying unit is coupled to the second resonant tank. An output side of the second rectifying unit is coupled to an output side of the first rectifying unit to form a common-connected output side. The detection unit is coupled to the common-connected output side and the detection unit provides a detection signal. The isolated transmission unit is coupled to the detection unit and the isolated transmission unit receives the detection signal and provides a feedback signal. The control unit receives the feedback signal and controls the first switching unit and the second switching unit according to the feedback signal.

In one embodiment, each of the first resonant tank and the second resonant tank includes a resonant capacitor, a resonant inductor, and a magnetic conductive unit. The magnetic conductive unit has a first side and a second side. The first side is coupled in series to the resonant capacitor and the resonant inductor, and the second side is coupled in series to the first rectifying unit or the second rectifying unit.

In one embodiment, the first side of the magnetic conductive unit has two ends. The resonant capacitor and the resonant inductor are coupled to different ends of the first side of the magnetic conductive unit to form a series-connected circuit structure; the series-connected circuit structure is coupled in parallel to the second switch element or the third switch element.

In one embodiment, the first side of the magnetic conductive unit has two ends. The resonant capacitor is coupled to the resonant inductor, and then coupled to the same end of the first side of the magnetic conductive unit to form a series-connected circuit structure; the series-connected circuit structure is coupled in parallel to the second switch element or the third switch element.

In one embodiment, the detection unit includes a detection resistor and a calculation unit. The detection resistor is coupled to the common-connected output side and the detection resistor detects a current flowing through the common-connected output side. The calculation unit is coupled in parallel to the detection resistor, and the calculation unit receives voltage values at two ends of the detection resistor and provide the detection signal by calculating the voltage values.

In one embodiment, the isolated transmission unit receives the detection signal provided from the detection unit to provide the feedback signal. The control unit simultaneously turns off the first switch element and the second switch element to decouple the first resonant conversion circuit or simultaneously turns off the third switch element and the fourth switch element to decouple the second resonant conversion circuit according to the feedback signal.

In one embodiment, the resonant converter further includes a fifth switch element and a sixth switch element. The fifth switch element is coupled between the input power source and the first switch element. The sixth switch element is coupled between the input power source and the third switch element. The isolated transmission unit receives the detection signal provided from the detection unit to provide the feedback signal. The control unit turns off the fifth switch element to decouple the first resonant conversion circuit or turns off the sixth switch element to decouple the second resonant conversion circuit according to the feedback signal.

In one embodiment, the detection signal is a voltage signal or a current signal.

In one embodiment, each of the first rectifying unit and the second rectifying unit includes an energy-storing element and a semiconductor element. The energy-storing element is coupled between the second side of the magnetic conductive unit and the common-connected output side. The semiconductor element is coupled in parallel to the energy-storing element.

In one embodiment, the energy-storing element is a physical capacitor rather than a parasitic capacitance of the semiconductor element.

In one embodiment, the energy-storing element and the resonant capacitor form an equivalent resonant capacitor, and the equivalent resonant capacitor and the resonant inductor determine resonant parameters of the first resonant tank and the second resonant tank.

Accordingly, the resonant converter of the present disclosure has following features and advantages: 1. The inherent characteristics of the circuit elements are utilized to coordinate with the corresponding control signals to achieve phase interleaving control between the two resonant conversion circuits without adding extra complicated PLL and its control circuits, thereby reducing circuit costs, simplifying circuit controls, and increasing the dynamic performance of phase controls; 2. In a light-loading condition, any one of the resonant conversion circuits can be easily selected to be decoupled by simple signal controls, thereby sufficiently supplying power to the load and reducing basic power consumption to significantly increase light-loading efficiency; 3. The accurate phase interleaving control is implemented to effectively reduce output ripples of the resonant conversion circuits, thereby reducing the capacity of the output capacitor and its size, increasing the stability of the feedback control, and contributing the use of products depending on the voltage precision; 4. The parallel-connected resonant conversion circuits are used to effectively reduce copper losses of magnetic elements and increase the conversion efficiency when the resonant converter is applied to high power applications; 5. The simple control manner is implemented to achieve a current-sharing function based on the main circuit elements which are extremely uniform; 6. The main circuit elements of the parallel-connected resonant conversion circuits are commonly used to reduce the number of circuit elements and reduce the process of circuit production.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
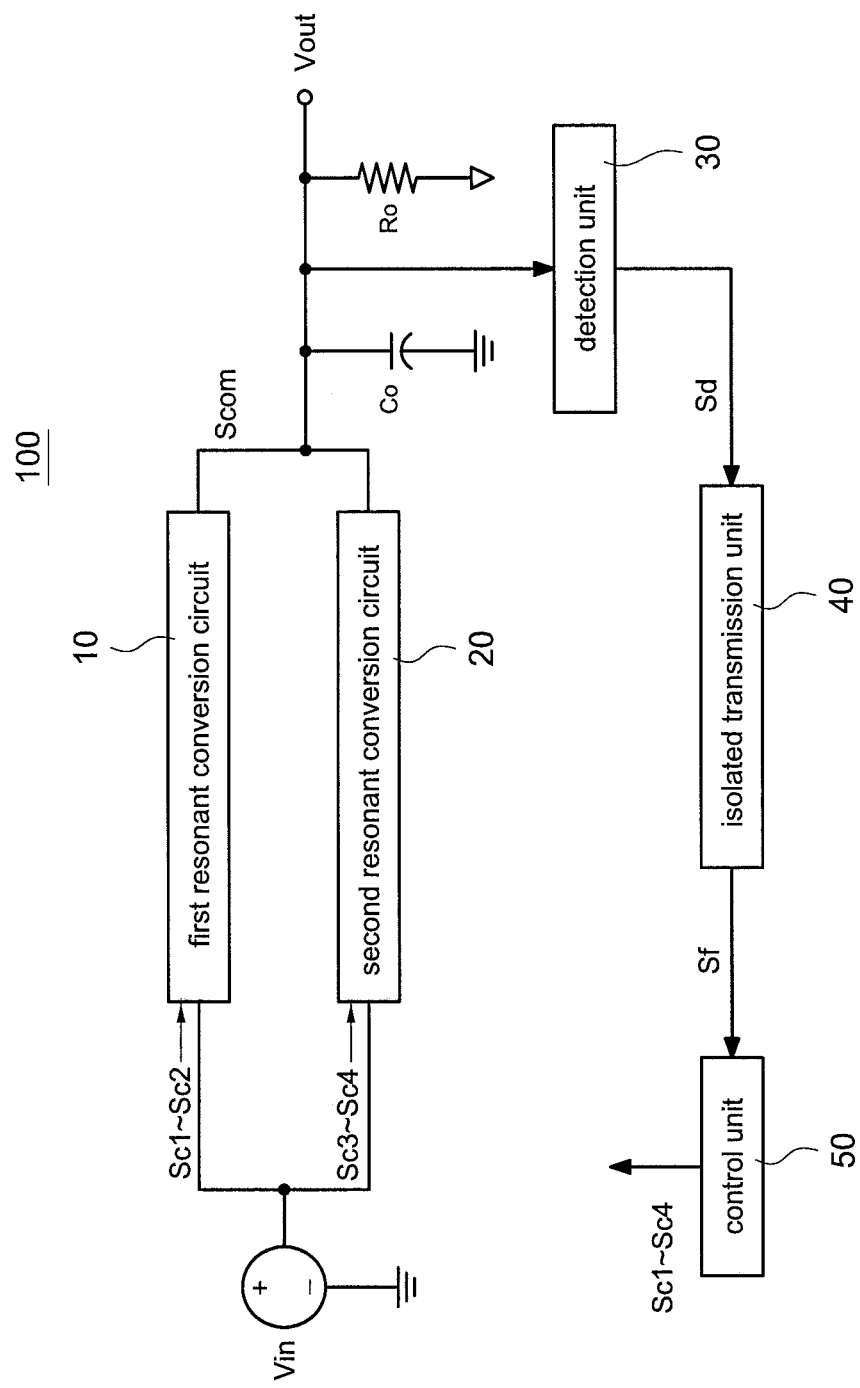
FIG. 1 is a circuit block diagram of a resonant converter according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a circuit block diagram of a resonant converter according to a first embodiment of the present disclosure. The resonant converter 100 includes a first resonant conversion circuit 10, a second resonant conversion circuit 20, a detection unit 30, an isolated transmission unit, and a control unit 50.

The first resonant conversion circuit 10 is coupled in parallel to the second resonant conversion circuit 20, and an output side of the first resonant conversion circuit 10 and an output side of the second resonant conversion circuit 20 are coupled to each other to form a common-connected output side Scom. The first resonant conversion circuit 10 and the second resonant conversion circuit 20 receive an input power source Vin and convert the input power source Vin into an output power source Vout. In one embodiment, both the input power source Vin and the output power source Vout are direct-current (DC) power source.

Figure 2A:
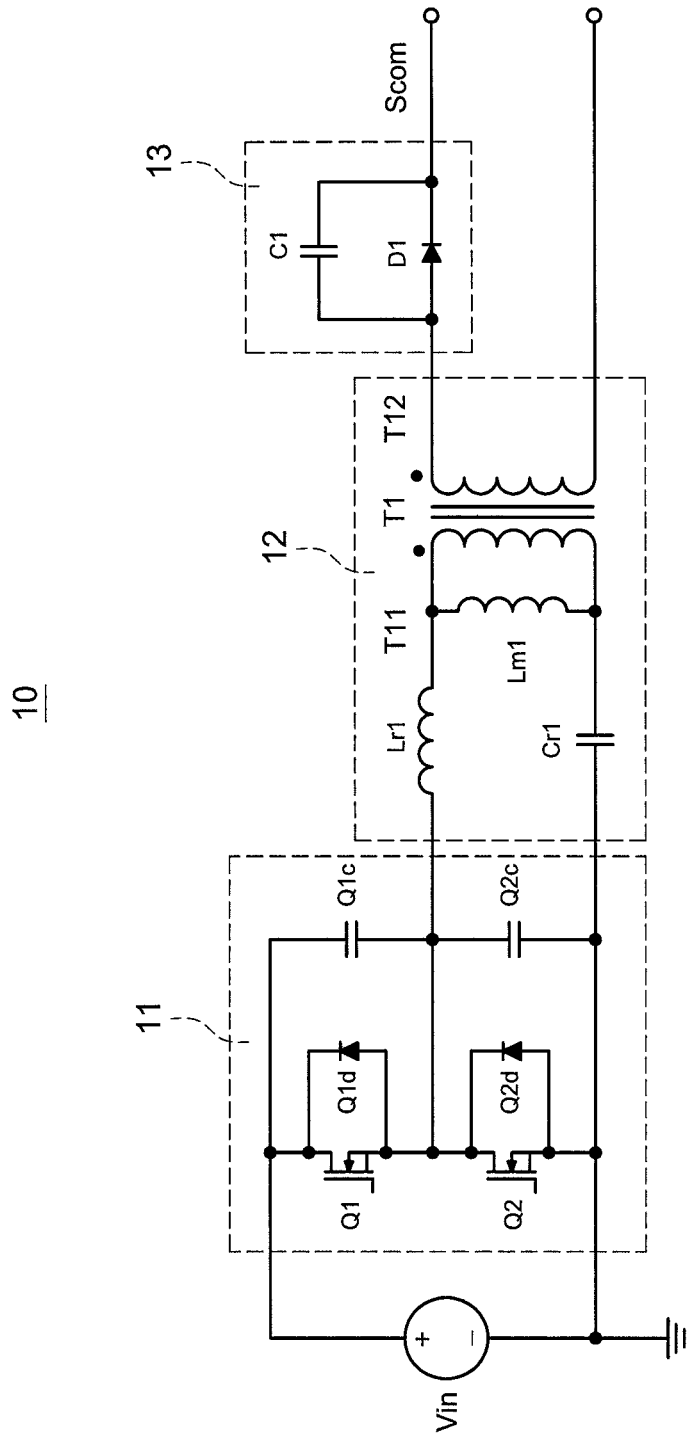
FIG. 2A is a circuit diagram of a first resonant conversion circuit according to the present disclosure.
Figure 2B:
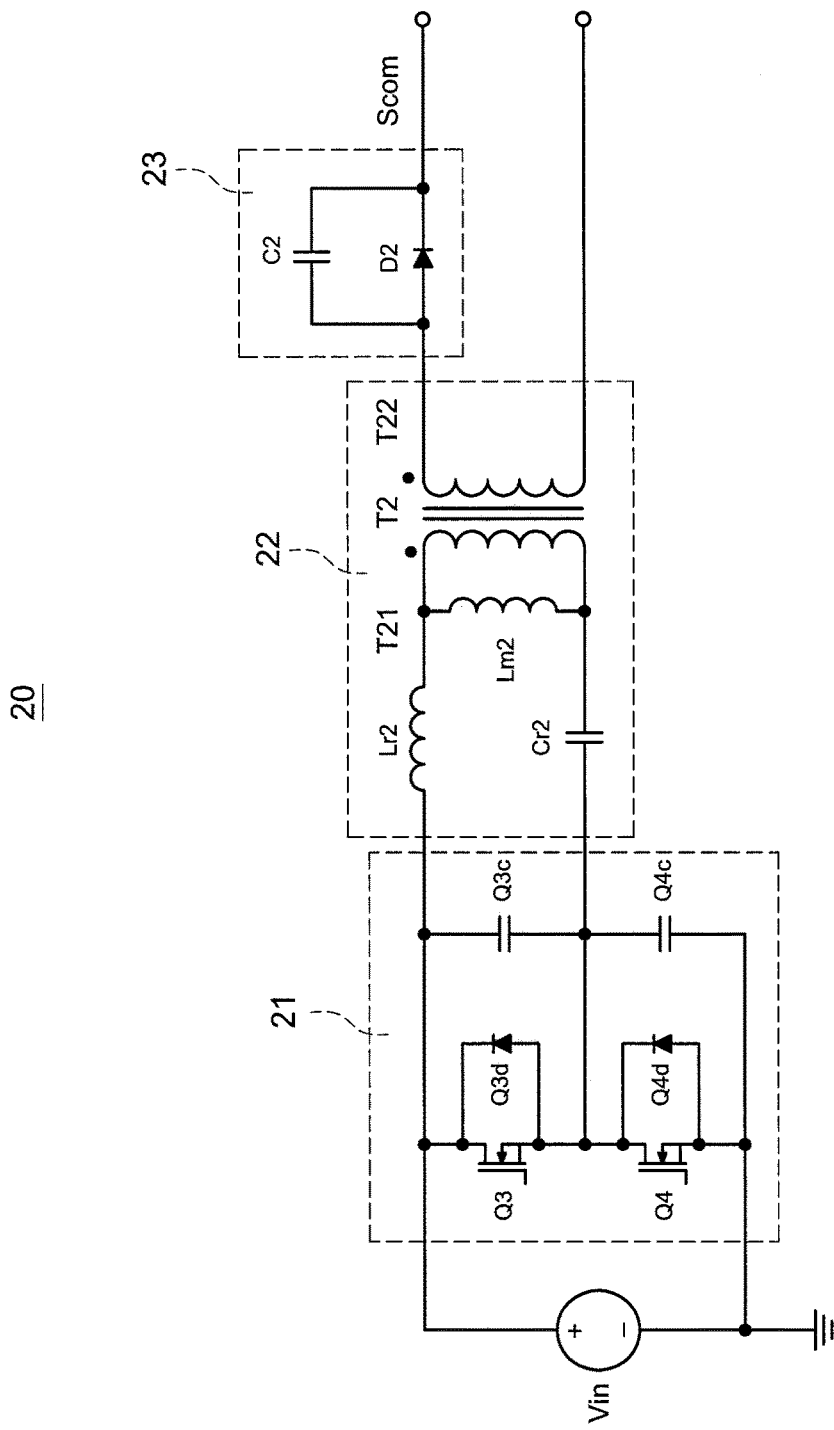
FIG. 2B is a circuit diagram of a second resonant conversion circuit according to the present disclosure.

Please refer to FIG. 2A and FIG. 2B, which show a circuit diagram of a first resonant conversion circuit and a circuit diagram of a second resonant conversion circuit according to the present disclosure, respectively. As shown in FIG. 2A, the first resonant conversion circuit 10 includes a first switching unit 11, a first resonant tank 12, and a first rectifying unit 13. The first switching unit 11 includes a first switch element Q1 and a second switch element Q2. The first switch element Q1 has a first body diode Q1$d$ and a first parasitic capacitance Q1$c$, and the second switch element Q2 has a second body diode Q2$d$ and a second parasitic capacitance Q2c. The first switch element Q1 is ungrounded coupled between the input power source Vin and the second switch element Q2, and the second switch element Q2 is grounded.

The first resonant tank 12 is coupled in parallel to the second switch element Q2. The first resonant tank 12 includes a first resonant capacitor Cr1, a first resonant inductor Lr1, and a first magnetic conductive unit T1. The first magnetic conductive unit T1 has a first side T11 and a second side T12. The first side T11 is coupled in series to the first resonant capacitor Cr1 and the first resonant inductor Lr1; the second side T12 is coupled in series to the first rectifying unit 13. In this embodiment, the first magnetic conductive unit T1 is a first isolation transformer (hereinafter referred to as "first transformer"), and therefore the first side T11 is a primary side of the first transformer and the second side T12 is a secondary side of the first transformer.

The first rectifying unit 13 is coupled to the first resonant tank 12, and the first rectifying unit 13 includes a first energy-storing element C1 and a first semiconductor element D1. The first energy-storing element C1 is coupled between the second side T12 of the first magnetic conductive unit T1 and the common-connected output side Scom. The first semiconductor element D1 is coupled in parallel to the first energy-storing element C1. Since the first energy-storing element C1 plays a significant role for a resonant operation of the first resonant tank 12, the first energy-storing element C1 is a physical capacitor rather than a parasitic capacitance of the first semiconductor element D1, and therefore to provide substantial functions for the resonant operation of the first resonant tank 12. In this embodiment, the first energy-storing element C1 and the first resonant capacitor Cr1 form a first equivalent resonant capacitor, also referred to as "first total resonant capacitor" for the first resonant tank 12. Also, the first equivalent resonant capacitor and the first resonant inductor Lr1 determine resonant parameters of the first resonant tank 12, such as a resonant frequency, a quality factor, a bandwidth, and so on. More specifically, the first energy-storing element C1 may be reflected to the primary side of the first magnetic conductive unit T1, namely the first transformer by a turn ratio between the primary side and the secondary side, and combines with the first resonant capacitor Cr1 to form the first equivalent resonant capacitor. Moreover, the first semiconductor element D1 is a diode, and an anode of the diode is coupled to the second side T12 of the first magnetic conductive unit T1 and a cathode of the diode is coupled to the common-connected output side Scom.

As shown in FIG. 2B, the second resonant conversion circuit 20 includes a second switching unit 21, a second resonant tank 22, and a second rectifying unit 23. The second switching unit 21 includes a third switch element Q3 and a fourth switch element Q4. The third switch element Q3 has a third body diode Q3d and a third parasitic capacitance Q3c, and the fourth switch element Q4 has a fourth body diode Q4d and a fourth parasitic capacitance Q4c. The third switch element Q3 is ungrounded coupled between the input power source Vin and the fourth switch element Q4, and the fourth switch element Q4 is grounded.

The second resonant tank 22 is coupled in parallel to the third switch element Q3. The second resonant tank 22 includes a second resonant capacitor Cr2, a second resonant inductor Lr2, and a second magnetic conductive unit T2. The second magnetic conductive unit T2 has a first side T21 and a second side T22. The first side T21 is coupled in series to the second resonant capacitor Cr2 and the second resonant inductor Lr2; the second side T22 is coupled in series to the second rectifying unit 23. In this embodiment, the second magnetic conductive unit T2 is a second isolation transformer (hereinafter referred to as "second transformer"), and therefore the first side T21 is a primary side of the second transformer and the second side T22 is a secondary side of the second transformer.

The second rectifying unit 23 is coupled to the second resonant tank 22, and the second rectifying unit 23 includes a second energy-storing element C2 and a second semiconductor element D2. The second energy-storing element C2 is coupled between the second side T22 of the second magnetic conductive unit T2 and the common-connected output side Scom. The second semiconductor element D2 is coupled in parallel to the second energy-storing element C2. Since the second energy-storing element C2 plays a significant role for a resonant operation of the second resonant tank 22, the second energy-storing element C2 is a physical capacitor rather than a parasitic capacitance of the second semiconductor element D2, and therefore to provide substantial functions for the resonant operation of the second resonant tank 22. In this embodiment, the second energy-storing element C2 and the second resonant capacitor Cr2 form a second equivalent resonant capacitor, also referred to as "second total resonant capacitor" for the second resonant tank 22. Also, the second equivalent resonant capacitor and the second resonant inductor Lr2 determine resonant parameters of the second resonant tank 22, such as a resonant frequency, a quality factor, a bandwidth, and so on. More specifically, the second energy-storing element C2 may be reflected to the primary side of the second magnetic conductive unit T2, namely the second transformer by a turn ratio between the primary side and the secondary side, and combines with the second resonant capacitor Cr2 to form the second equivalent resonant capacitor. Moreover, the second semiconductor element D2 is a diode, and an anode of the diode is coupled to the second side T22 of the second magnetic conductive unit T2 and a cathode of the diode is coupled to the common-connected output side Scom.

Refer to FIG. 1 again, the detection unit 30 is coupled to the common-connected output side Scom and provides the detection signal Sd. The detection signal Sd may be a voltage signal or a current signal. The isolated transmission unit 40 is coupled to the detection unit 30, and receives the detection signal Sd and provides the feedback signal Sf. The control unit 50 receives the feedback signal Sf and controls the first switching unit 11 and the second switching unit 21 according to the feedback signal Sf.

Figure 3A:
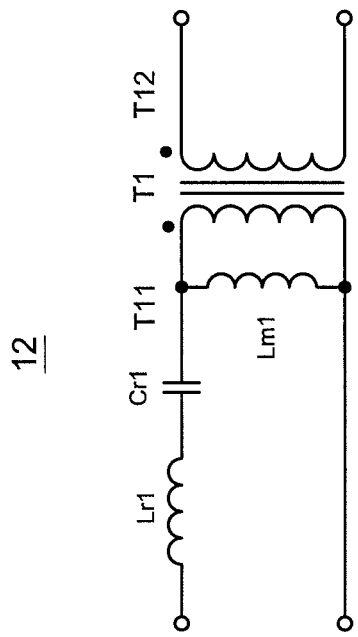
FIG. 3A is a circuit diagram of a resonant tank according to a first embodiment of the present disclosure.

Please refer to FIG. 3A, which shows a circuit diagram of a resonant tank according to a first embodiment of the present disclosure. In this embodiment, the first side T11 of the first magnetic conductive unit T1 has two ends, namely the primary side of the first transformer has a dotted end and a non-dotted end. The first resonant capacitor Cr1 and the first resonant inductor Lr1 are coupled to different ends of the primary side of the first transformer. In this embodiment, the first resonant inductor Lr1 is coupled to the dotted end of the primary side and the first resonant capacitor Cr1 is coupled to the non-dotted end of the primary side, and therefore to form a series-connected circuit structure and the series-connected circuit structure is coupled in parallel to the second switch element Q2.

Similarly, the first side T21 of the second magnetic conductive unit T2 has two ends, namely the primary side of the second transformer has a dotted end and a non-dotted end. The second resonant capacitor Cr2 and the second resonant inductor Lr2 are coupled to different ends of the primary side of the second transformer. In this embodiment, the second resonant inductor Lr2 is coupled to the dotted end of the primary side and the second resonant capacitor Cr2 is coupled to the non-dotted end of the primary side, and therefore to form a series-connected circuit structure and the series-connected circuit structure is coupled in parallel to the third switch element Q3. However, the first resonant inductor Lr1 and second resonant inductor Lr2 are not limited to be coupled to the dotted ends of the primary sides of the first transformer and the second transformer, respectively. Also, the first resonant capacitor Cr1 and the second resonant capacitor Cr2 are not limited to be coupled to the non-dotted ends of the primary sides of the first transformer and the second transformer, respectively. In other words, the first resonant inductor Lr1 and second resonant inductor Lr2 may be coupled to the non-dotted ends of the primary sides of the first transformer and the second transformer, respectively. Also, the first resonant capacitor Cr1 and the second resonant capacitor Cr2 may be coupled to the dotted ends of the primary sides of the first transformer and the second transformer, respectively. The same circuit function can be achieved by the above-mentioned different embodiments.

Figure 3B:
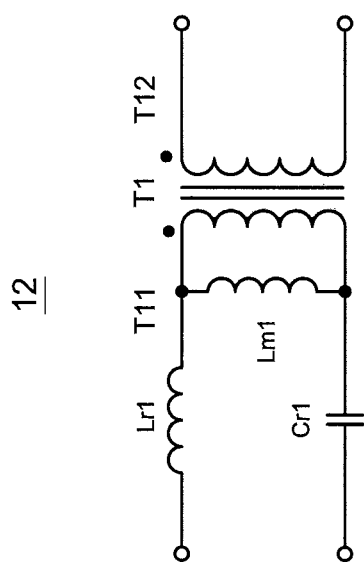
FIG. 3B is a circuit diagram of the resonant tank according to a second embodiment of the present disclosure.

Please refer to FIG. 3B, which shows a circuit diagram of the resonant tank according to a second embodiment of the present disclosure. In this embodiment, the first side T11 of the first magnetic conductive unit T1 has two ends, namely the primary side of the first transformer has a dotted end and a non-dotted end. The first resonant capacitor Cr1 is coupled to the first resonant inductor Lr1, and then are coupled to the same end of the primary side T11 of the first transformer. In this embodiment, the first resonant capacitor Cr1 is coupled to the first resonant inductor Lr1, and then are coupled to the dotted end of the primary side, and therefore to form a series-connected circuit structure and the series-connected circuit structure is coupled in parallel to the second switch element Q2.

Similarly, the first side T21 of the second magnetic conductive unit T2 has two ends, namely the primary side of the second transformer has a dotted end and a non-dotted end. The second resonant capacitor Cr2 is coupled to the second resonant inductor Lr2, and then are coupled to the same end of the primary side T21 of the second transformer. In this embodiment, the second resonant capacitor Cr2 is coupled to the second resonant inductor Lr2, and then are coupled to the dotted end of the primary side, and therefore to form a series-connected circuit structure and the series-connected circuit structure is coupled in parallel to the third switch element Q3. However, the series-connected circuit structures are not limited to be coupled to the dotted ends of the primary sides of the first transformer and the second transformer, respectively. In other words, the series-connected circuit structures may be coupled to the non-dotted ends of the primary sides of the first transformer and the second transformer, respectively. The same circuit function can be achieved by the above-mentioned different embodiments.

Figure 4:
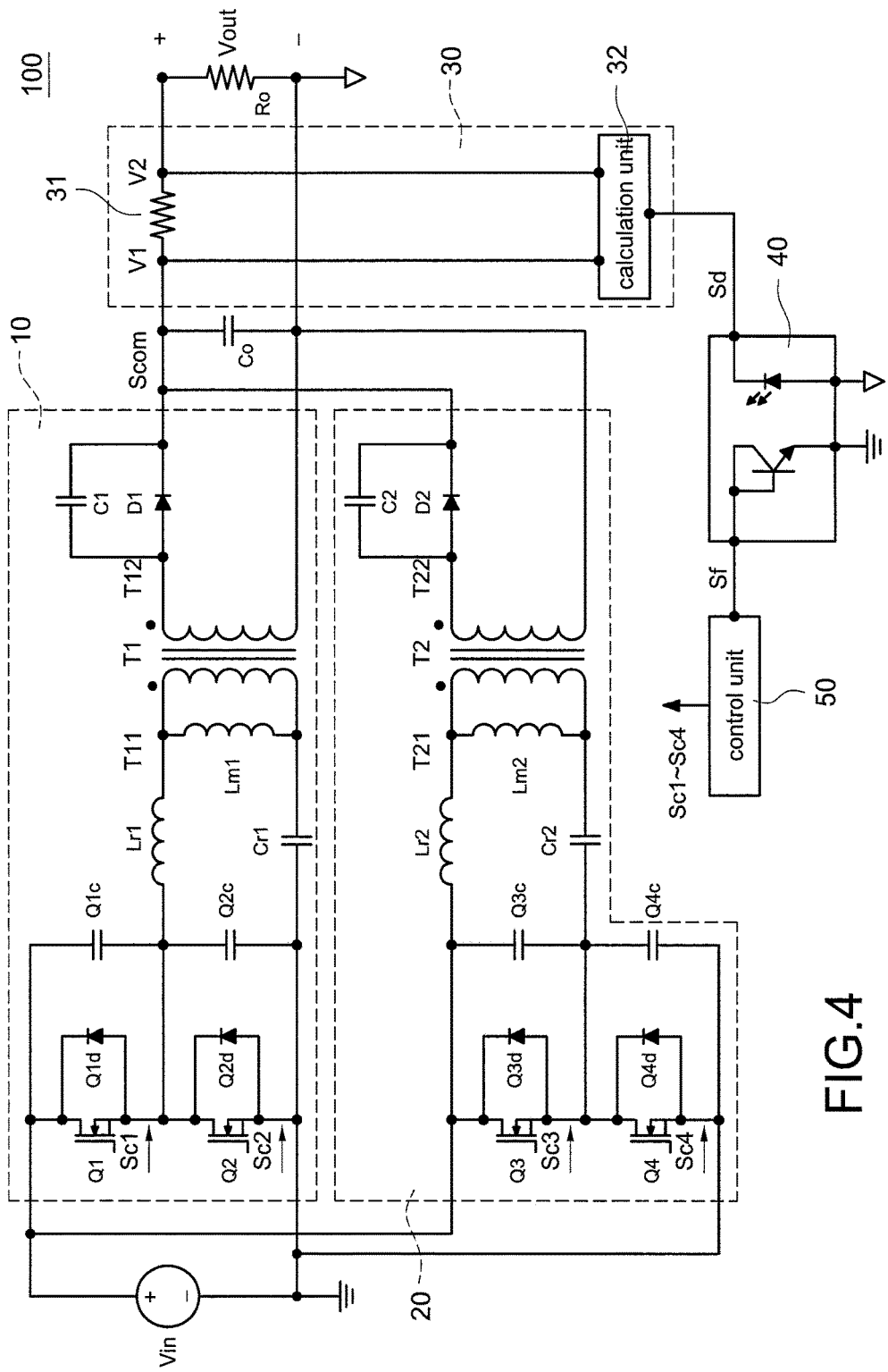
FIG. 4 is a detail circuit diagram of FIG. 1.

Please refer to FIG. 4, which shows a detail circuit diagram of FIG. 1. The detection unit 30 includes a detection resistor 31 and a calculation unit 32. The detection resistor 31 is coupled to the common-connected output side Scom to sense a current flowing through the common-connected output side Scom. The calculation unit 32 is coupled in parallel to the detection resistor 31, receives voltage values at two ends of the detection resistor 31, and provides the detection signal Sd by calculating the voltage values. More specifically, two voltage values across two ends of the detection resistor 31 including a first voltage V1 and a second voltage V2 are detected by the detection resistor 31 and a current (i.e., a load current) flowing through the detection resistor 31, namely a voltage difference between the first voltage V1 and the second voltage V2 is equal to a voltage difference at two ends of the detection resistor 31. As the load is heavier, the load current is greater, and therefore the voltage difference between the first voltage V1 and the second voltage V2 is greater. Since the calculation unit 32 has resistance data of the detection resistor 31, the calculation unit 32 can calculate and determine loading condition of the load Ro, including a light-loading condition or a heavy-loading condition according the resistance data and voltage data of the first voltage V1 and the second voltage V2 received by the calculation unit 32. The calculation unit 32 may be, for example but not limited to, implemented by an operational amplifier (OPA), and therefore an inverting input end and a non-inverting input end of the OPA may respectively receive the first voltage V1 and the second voltage V2 to calculate the first voltage V1 and the second voltage V2 and output the detection signal Sd from an output end of the OPA.

In this embodiment, the isolated transmission unit 40 is a photo coupler. The isolated transmission unit 40 is used for isolated feedback between the detection unit 30 and the control unit 50. More specifically, electrical information detected at a load side, namely an output side of the resonant converter, such as output current information or output voltage information is fed back to the control unit 50 in an isolated manner. The isolated transmission unit 40 receives the detection signal Sd, which is outputted from the calculation unit 32, transmitted from the detection unit 30, converts the detection signal Sd into the feedback signal Sf, and provides the feedback signal Sf to the control unit 50.

The control unit 50 further outputs a plurality of control signals Sc1-Sc4 to respectively control the first switch element Q1 and the second switch element Q2 of the first resonant conversion circuit 10 and the third switch element Q3 and the fourth switch element Q4 of the second resonant conversion circuit 20 according to the feedback signal Sf. Accordingly, the first resonant conversion circuit 10 and the second resonant conversion circuit 20 are controlled at different operation states to achieve a complete resonant conversion operation, and the detailed description will be made hereinafter with reference from FIG. 7A to FIG. 7H.

As mentioned above, either the first resonant conversion circuit 10 or the second resonant conversion circuit 20 can be decoupled when the resonant converter 100 operates in the light-loading condition, that is, just one of the resonant conversion circuits is used to convert power and sufficiently supply power to the load Ro, thereby reducing basic power consumption and significantly increasing light-loading efficiency. Accordingly, two decouple controls are proposed in the present disclosure for energy saving in the light-loading condition. In particular, the "light-loading condition" means that any one of the resonant conversion circuits is sufficient to effectively and normally supply the required power for the load Ro.

The first decouple control is: when the detection unit 30 detects that the load Ro is in a light-loading condition, the detection unit 30 provides the detection signal Sd to the isolated transmission unit 40 and the isolated transmission unit 40 provides the feedback signal Sf to notify the control unit 50, and therefore the control unit 50 can decouple the first resonant conversion circuit 10 or the second resonant conversion circuit 20 according to the feedback signal Sf. For example, if the first resonant conversion circuit 10 is selected to be decoupled, the control unit 50 simultaneously turns off the first switch element Q1 and the second switch element Q2 to decouple the first resonant conversion circuit 10. At this condition, only the second resonant conversion circuit 20 is used to convert power and supply power to the load Ro. Alternatively, if the second resonant conversion circuit 20 is selected to be decoupled, the control unit 50 simultaneously turns off the third switch element Q3 and the fourth switch element Q4 to decouple the second resonant conversion circuit 20. At this condition, only the first resonant conversion circuit 10 is used to convert power and supply power to the load Ro.

Figure 5:
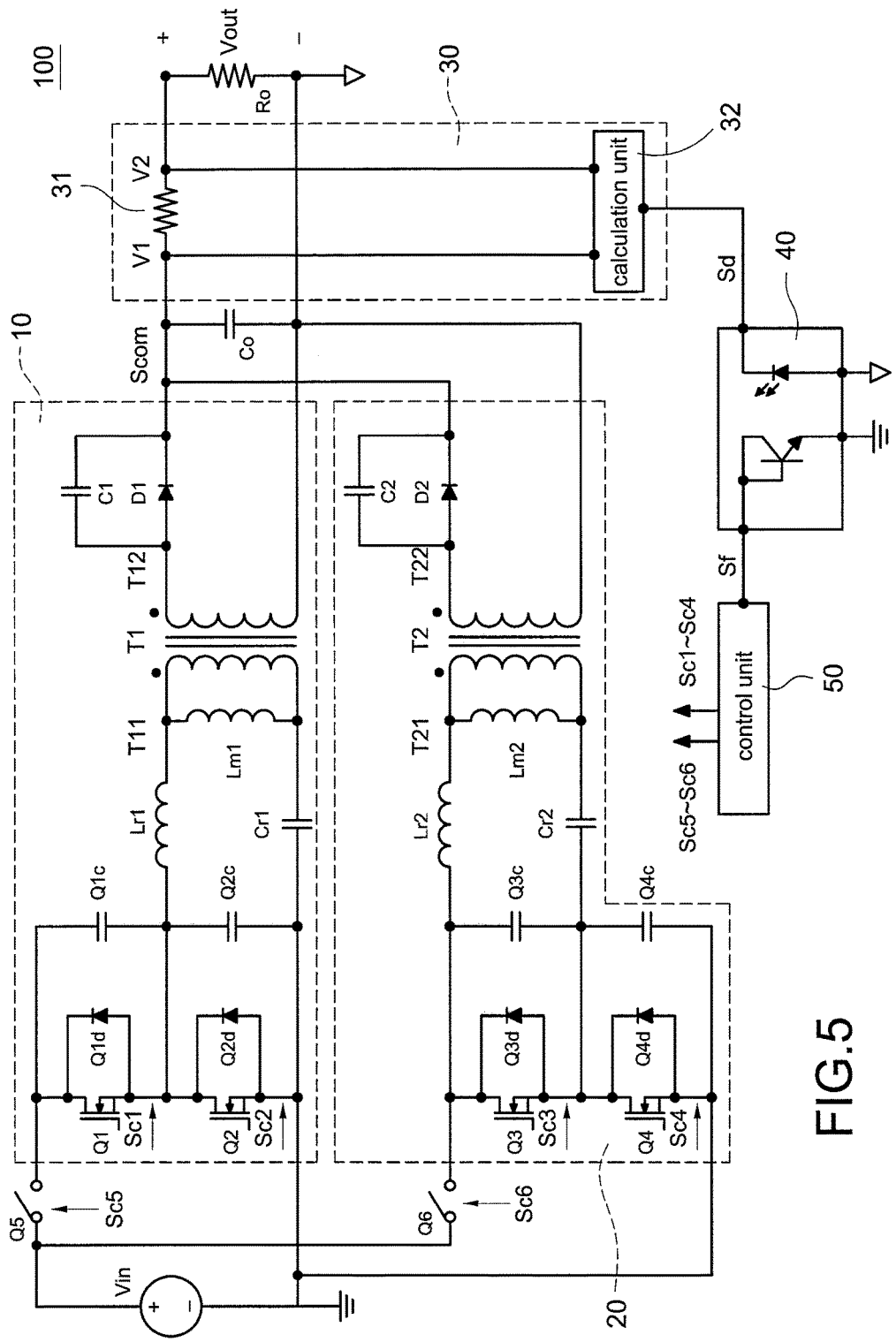
FIG. 5 is a circuit diagram of the resonant converter according to a second embodiment of the present disclosure.

Please refer to FIG. 5, which shows a circuit diagram of the resonant converter according to a second embodiment of the present disclosure. Compared to FIG. 4, the resonant converter shown in FIG. 5 further includes a fifth switch element Q5 and a sixth switch element Q6. The fifth switch element Q5 is coupled between the input power source Vin and the first switch element Q1. The sixth switch element Q6 is coupled between the input power source Vin and the third switch element Q3. The isolated transmission unit 40 receives the detection signal Sd transmitted from the detection unit 30 and provides the feedback signal Sf to the control unit 50. When the detection unit 30 detects that the load Ro is in a light-loading condition, the detection unit 30 provides the detection signal Sd to the isolated transmission unit 40 and the isolated transmission unit 40 provides the feedback signal Sf to notify the control unit 50, and therefore the control unit 50 can decouple the first resonant conversion circuit 10 or the second resonant conversion circuit 20 according to the feedback signal Sf. For example, if the first resonant conversion circuit 10 is selected to be decoupled, the control unit 50 turns off the fifth switch element Q5 by a fifth control signal Sc5 produced from the control unit 50 so as to disconnect a power supplying path between the input power source Vin and the first resonant conversion circuit 10, thereby decoupling the first resonant conversion circuit 10. At this condition, only the second resonant conversion circuit 20 is used to convert power and supply power to the load Ro. Alternatively, if the second resonant conversion circuit 20 is selected to be decoupled, the control unit 50 turns off the sixth switch element Q6 by a sixth control signal Sc6 produced from the control unit 50 so as to disconnect a power supplying path between the input power source Vin and the second resonant conversion circuit 20, thereby decoupling the second resonant conversion circuit 20. At this condition, only the first resonant conversion circuit 10 is used to convert power and supply power to the load Ro.

Moreover, regardless of the first decouple control or the second decouple control described above, the high consistent number of times of separately operating the first resonant conversion circuit 10 or the second resonant conversion circuit 20 can effectively prolong the operational life span of each of the resonant conversion circuits, namely increase overall life span and quality of the resonant converter 100.

Figure 6:
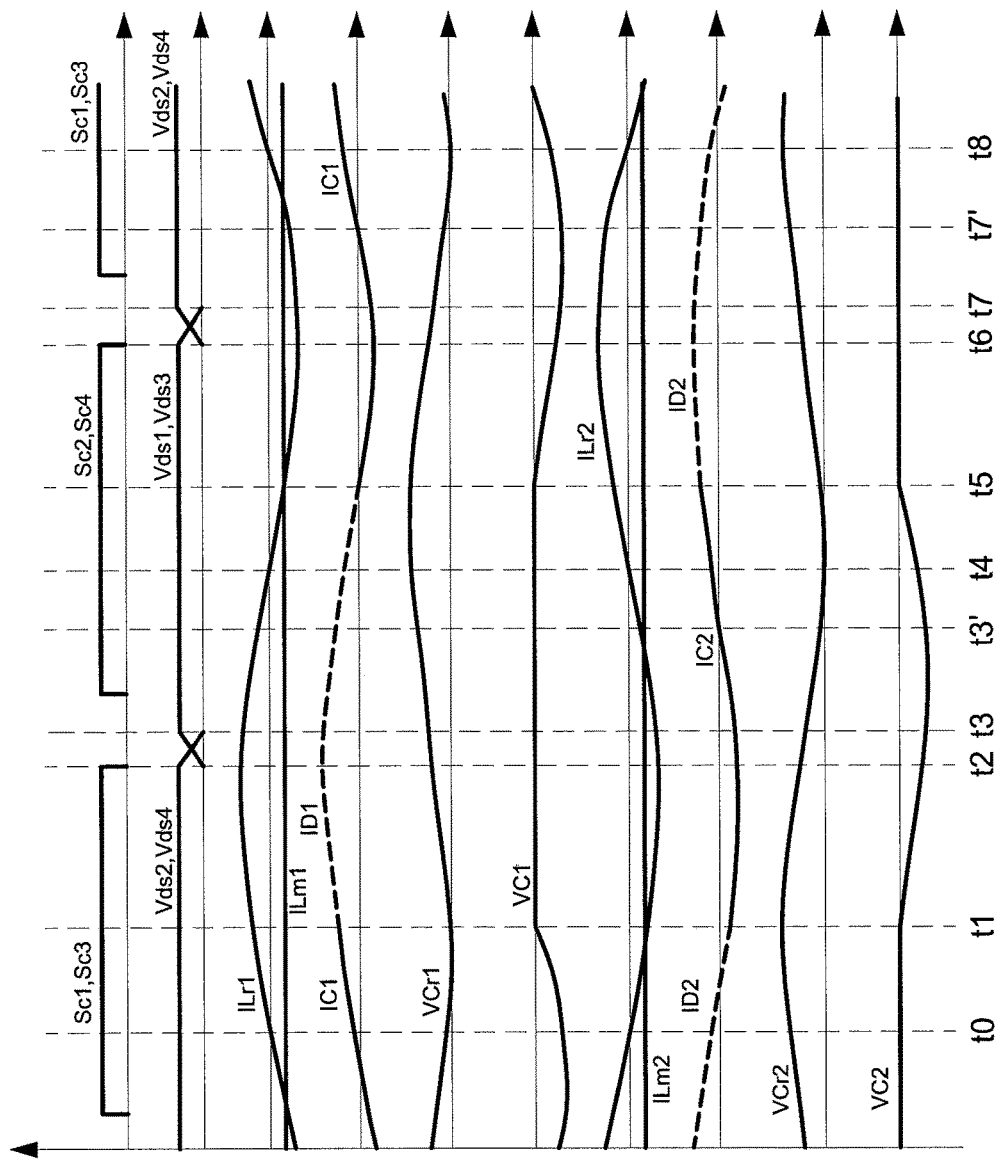
FIG. 6 shows waveforms of signals, currents, and voltages of the resonant converter according to the present disclosure.

Please refer to FIG. 6, which shows waveforms of signals, currents, and voltages of the resonant converter according to the present disclosure. The waveforms shown from top to bottom are control signals Sc1-Sc4, drain-source voltages of switch elements Vds1-Vds4, a current flowing through the first resonant inductor ILr1, a current flowing through the first magnetizing inductance ILm1, a current flowing through the first energy-storing element IC1 and a current flowing through the first semiconductor element ID1, a voltage across the first resonant capacitor VCr1, a voltage across the first energy-storing element VC1, a current flowing through the second resonant inductor ILr2, a current flowing through the second magnetizing inductance ILm2, a current flowing through the second energy-storing element IC2 and a current flowing through the second semiconductor element ID2, a voltage across the second resonant capacitor VCr2, and a voltage across the second energy-storing element VC2, respectively. The complete operation of circuits of the resonant converter can be described in eight operation states as follows. For convenience and simplification of analyzing the circuits, components and parameters, which have less influence on the circuits, are idealized assumptions. For example, it is assumed that the input power source Vin is an ideal DC power source, each switch element Q1-Q4, each semiconductor element D1,D2, and each magnetic conductive unit T1,T2 are ideal, each magnetizing inductance Lm1,Lm2 is infinite and each current flowing through each magnetizing inductance Lm1,Lm2 is regarded as constant, an output capacitor Co is infinite and a voltage across the output capacitor is regarded as constant, resonant circuits are inductive, and characteristics of the two resonant conversion circuits 10,20 are identical.

Figure 7A:
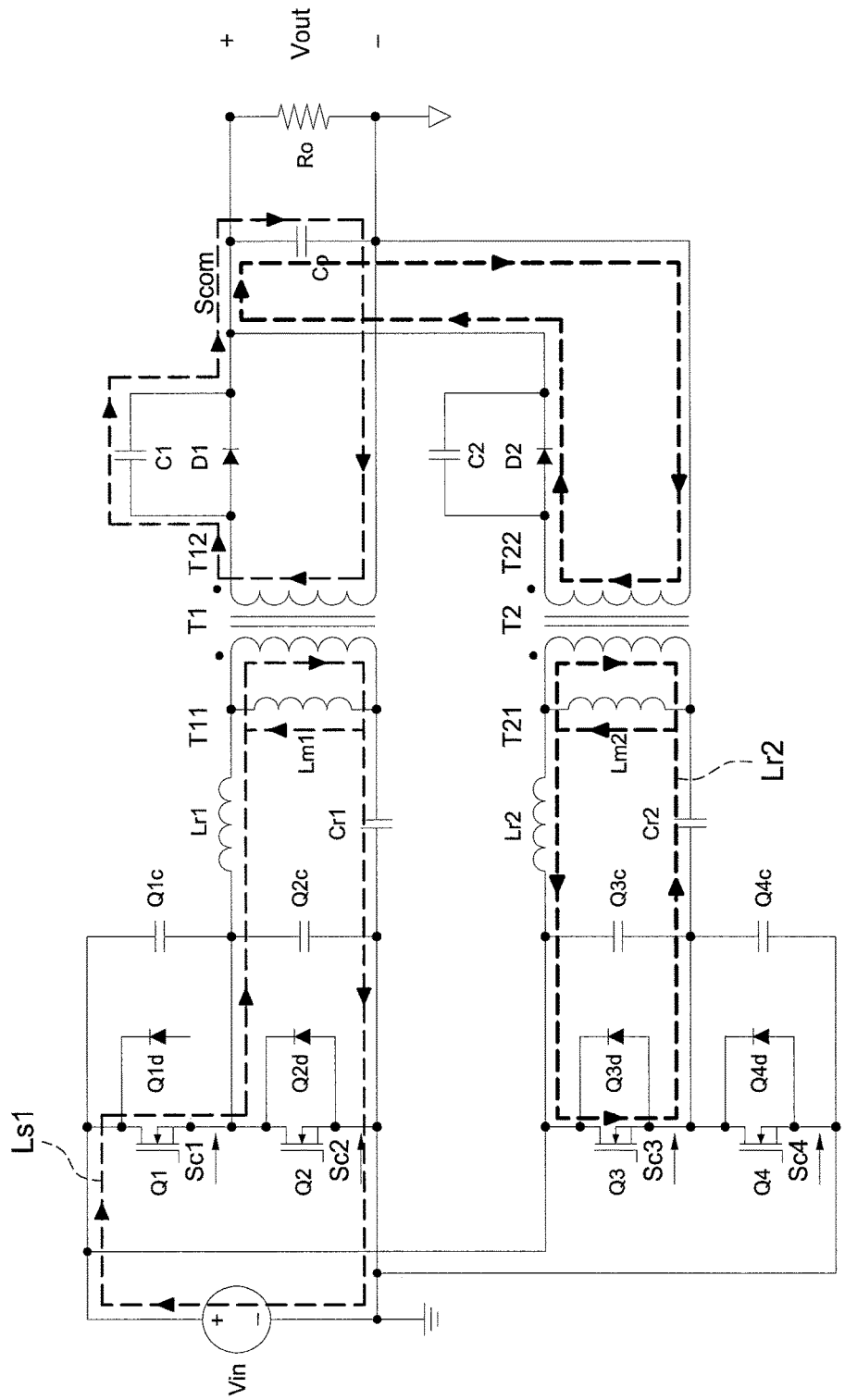
FIG. 7A is a circuit diagram of the resonant converter operating in a first state according to the present disclosure.

Please refer to FIG. 7A, which shows a circuit diagram of the resonant converter operating in a first state according to the present disclosure. Also, refer to a time interval t0-t1 shown in FIG. 6. In this embodiment, the first control signal Sc1 and the third control signal Sc3 are the same signal, and the second control signal Sc2 and the fourth control signal Sc4 are the same signal. In the first operation state; the first control signal Sc1 and the third control signal Sc3 are high-level signals to turn on the first switch element Q1 and the third switch element Q3, and the second control signal Sc2 and the fourth control signal Sc4 are low-level signals to turn off the second switch element Q2 and the fourth switch element Q4, and therefore the drain-source voltage Vds1 of the first switch element Q1 and the drain-source voltage Vds3 of the third switch element Q3 are zero, and the drain-source voltage Vds2 of the second switch element Q2 and the drain-source voltage Vds4 of the fourth switch element Q4 are not zero.

For the first resonant conversion circuit 10, the current flowing through the first resonant inductor ILr1 is from negative to positive at a time t0, and the first operation state starts. An input current flows from the first switch element Q1 to the first resonant inductor Lr1, and therefore the current flowing through the first resonant inductor ILr1 is increased in a sinusoidal form to make the first resonant inductor Lr1 store energy. Also, the current flowing through the first magnetizing inductance ILm1 is kept negative. At this condition, input energy is transferred from the primary side of the first magnetic conductive unit T1 (namely the first transformer) to the secondary side thereof, thereby charging the first energy-storing element C1 and increasing the voltage across the first energy-storing element VC1. In the first operation state, the first resonant inductor Lr1 is in an energy-storing state, and a first energy-storing path Ls1 is labeled at the primary side of the first transformer. Also, the current flowing through the first energy-storing element IC1 is proportional to a sum of the current flowing through the first resonant inductor ILr1 and the current flowing through the first magnetizing inductance ILm1. When the voltage across the first energy-storing element VC1 increased from negative to zero, namely a voltage across the first semiconductor element D1 is zero, the first semiconductor element D1 is turned on and the first operation state is completed.

For the second resonant conversion circuit 20, the current flowing through the second resonant inductor ILr2 is zero at the time t0 and continuously reduced, and therefore the second semiconductor element D2 is continuously turned on due to a forward-bias voltage across the second semiconductor element D2. In the first operation state, the second resonant inductor Lr2 is in an energy-releasing state, and a second energy-releasing path Lr2 is labeled at the primary side of the second transformer. At this condition, the current flowing through the second resonant inductor ILr2 is from positive to negative. When the current flowing through the second magnetizing inductance ILm2 is equal to the current flowing through the second resonant inductor ILr2, the current flowing through the second semiconductor element ID2 is zero and therefore the second semiconductor element D2 is turned off and the first operation state is completed.

Figure 7B:
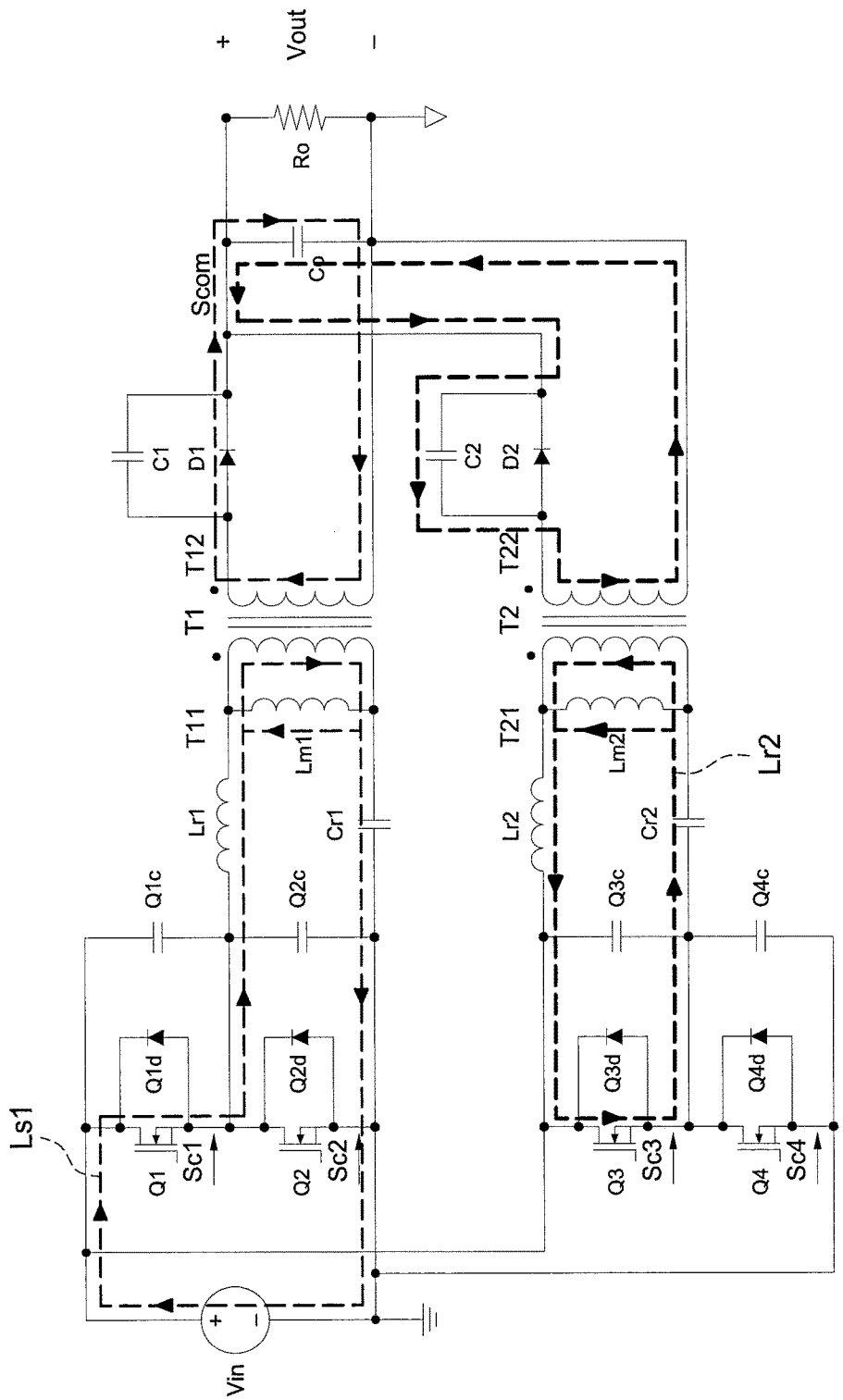
FIG. 7B is a circuit diagram of the resonant converter operating in a second state according to the present disclosure.

Please refer to FIG. 7B, which shows a circuit diagram of the resonant converter operating in a second state according to the present disclosure. Also, refer to a time interval t1-t2 shown in FIG. 6. In the second operation state, the first switch element Q1 and the third switch element Q3 are still turned on, and the second switch element Q2 and the fourth switch element Q4 are still turned off.

For the first resonant conversion circuit 10, the voltage across the first energy-storing element VC1 is charged to zero at a time t1, and therefore the first semiconductor element D1 is turned on due to a forward-bias voltage across the first semiconductor element D1. At this condition, the current flowing through the first resonant inductor ILr1 is continuously increased and a resonance occurs between the first resonant inductor Lr1 and the first resonant capacitor Cr1. Until the first switch element Q1 is turned off, the second operation state is completed.

For the second resonant conversion circuit 20, the second energy-storing element C2 is discharged at the time t1, and therefore the voltage across the second energy-storing element VC2 is decreased. At this time, a resonance occurs among the second energy-storing element C2, the second resonant capacitor Cr2, and the second resonant inductor Lr2, and the current flowing through the second resonant inductor ILr2 is negative and continuously decreased. Until the third switch element Q3 is turned off, the second operation state is completed.

Figure 7C:
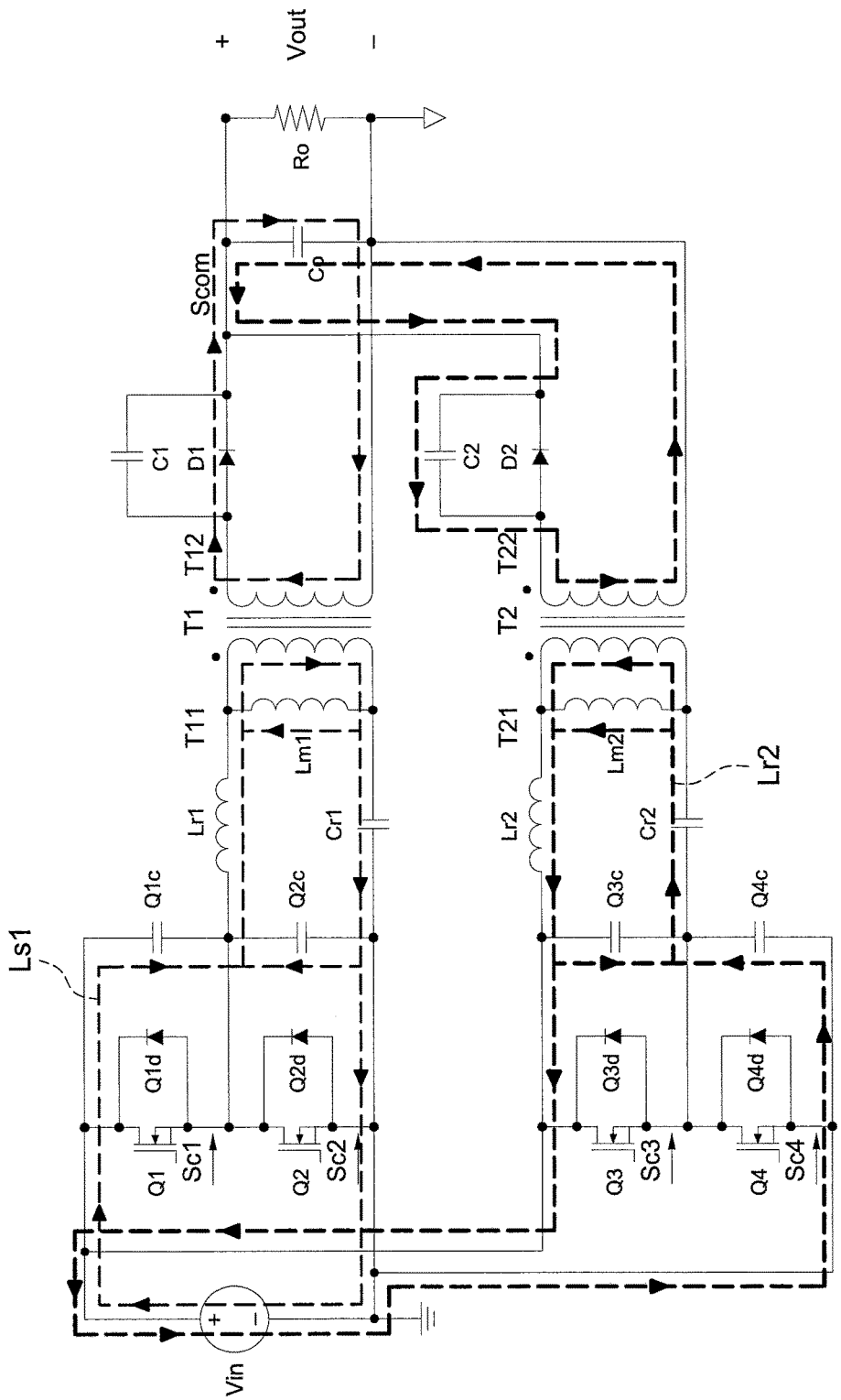
FIG. 7C is a circuit diagram of the resonant converter operating in a third state according to the present disclosure.

Please refer to FIG. 7C, which shows a circuit diagram of the resonant converter operating in a third state according to the present disclosure. Also, refer to a time interval t2-t3 shown in FIG. 6. In the third operation state, the first switch element Q1, the second switch element Q2, the third switch element Q3, and the fourth switch element Q4 are turned off.

For the first resonant conversion circuit 10, the first switch element Q1 is turned off at a time t2, and the current flowing through the first resonant inductor ILr1, namely a resonant current is continuously increased. In order to maintain the first resonant inductor Lr1 to be in the energy-storing state, the current flowing through the first resonant inductor ILr1 flows through the first parasitic capacitance Q1c of the first switch element Q1 to charge the first parasitic capacitance Q1c. At the same time, the second parasitic capacitance Q2c of the second switch element Q2 discharges, and therefore the drain-source voltage Vds2 of the second switch element Q2 is reduced. Until a voltage across the first parasitic capacitance Q1c is charged up to a voltage of the input power source Vin and a voltage across the second parasitic capacitance Q2c is discharged to zero, the third operation state is completed.

For the second resonant conversion circuit 20, the current flowing through the second resonant inductor ILr2 is continuously decreased. In order to maintain the second resonant inductor Lr2 to be in the energy-releasing state, the current flowing through the second resonant inductor ILr2 flows through the third parasitic capacitance Q3c of the third switch element Q3 to charge the third parasitic capacitance Q3c. At the same time, the fourth parasitic capacitance Q4c of the fourth switch element Q4 discharges, and therefore the drain-source voltage Vds3 of the third switch element Q3 is increased. Until a voltage across the third parasitic capacitance Q3c is charged up to a voltage of the input power source Vin and a voltage across the fourth parasitic capacitance Q4c is discharged to zero, the third operation state is completed.

Figure 7D:
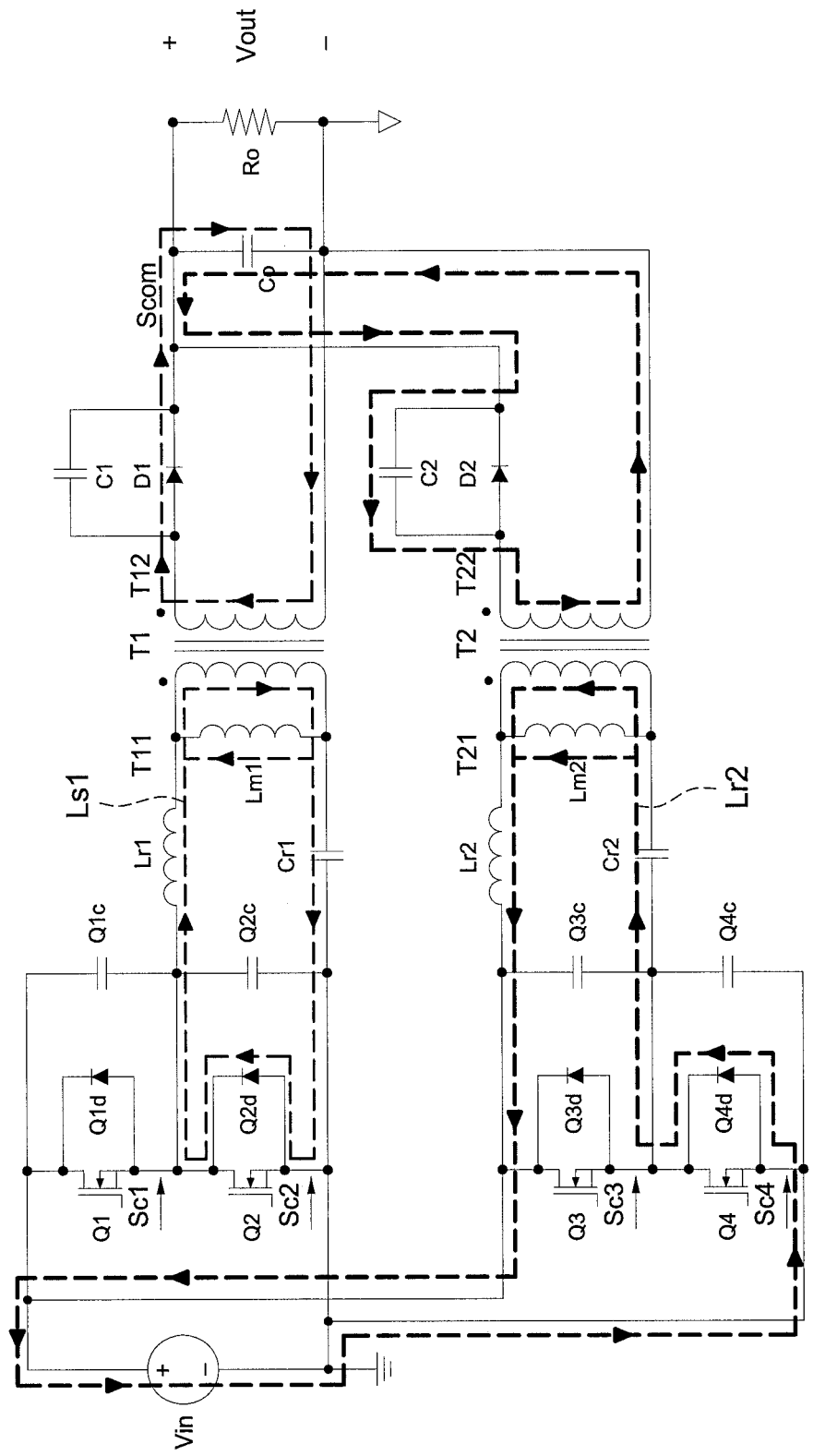
FIG. 7D is a circuit diagram of the resonant converter operating in a fourth state according to the present disclosure.

Please refer to FIG. 7D, which shows a circuit diagram of the resonant converter operating in a fourth state according to the present disclosure. Also, refer to a time interval t3-t4 shown in FIG. 6. In the beginning of the fourth operation state, the first switch element Q1, the second switch element Q2, the third switch element Q3, and the fourth switch element Q4 are turned off. During the fourth operation state, the second switch element Q2 and the fourth switch element Q4 are turned on, and the first switch element Q1 and the third switch element Q3 are still turned off, and therefore the drain-source voltage Vds2 of the second switch element Q2 and the drain-source voltage Vds4 of the fourth switch element Q4 are zero, and the drain-source voltage Vds1 of the first switch element Q1 and the drain-source voltage Vds3 of the third switch element Q3 are not zero.

For the first resonant conversion circuit 10, when the drain-source voltage Vds2 of the second switch element Q2 reduces to zero, the current flowing through the first resonant inductor ILr1, namely the resonant current flows through the second body diode Q2d of the second switch element Q2 so as to maintain the first resonant inductor Lr1 to be in the energy-storing state. At this time, the second switch element Q2 is appropriately switched to achieve a zero voltage switching (ZVS) operation, thereby effectively reducing the switching losses and increasing conversion efficiency of the resonant converter. Until the current flowing through the first resonant inductor ILr1 reduces to zero, the fourth operation state is completed.

For the second resonant conversion circuit 20, the current flowing through the second resonant inductor ILr2, namely the resonant current flows through the fourth body diode Q4d of the fourth switch element Q4 so as to maintain the second resonant inductor Lr2 to be in the energy-releasing state. At this time, the fourth switch element Q4 is appropriately switched to achieve a zero voltage switching (ZVS) operation, thereby effectively reducing the switching losses and increasing conversion efficiency of the resonant converter. When the current flowing through the second resonant inductor ILr2 is continuously increased to be equal to the current flowing through the second magnetizing inductance ILm2 at a time t3', the current flowing through the second energy-storing element IC2 is from negative to positive to charge the second energy-storing element C2. Until the current flowing through the second resonant inductor ILr2 increases from negative to zero, the fourth operation state is completed.

Figure 7E:
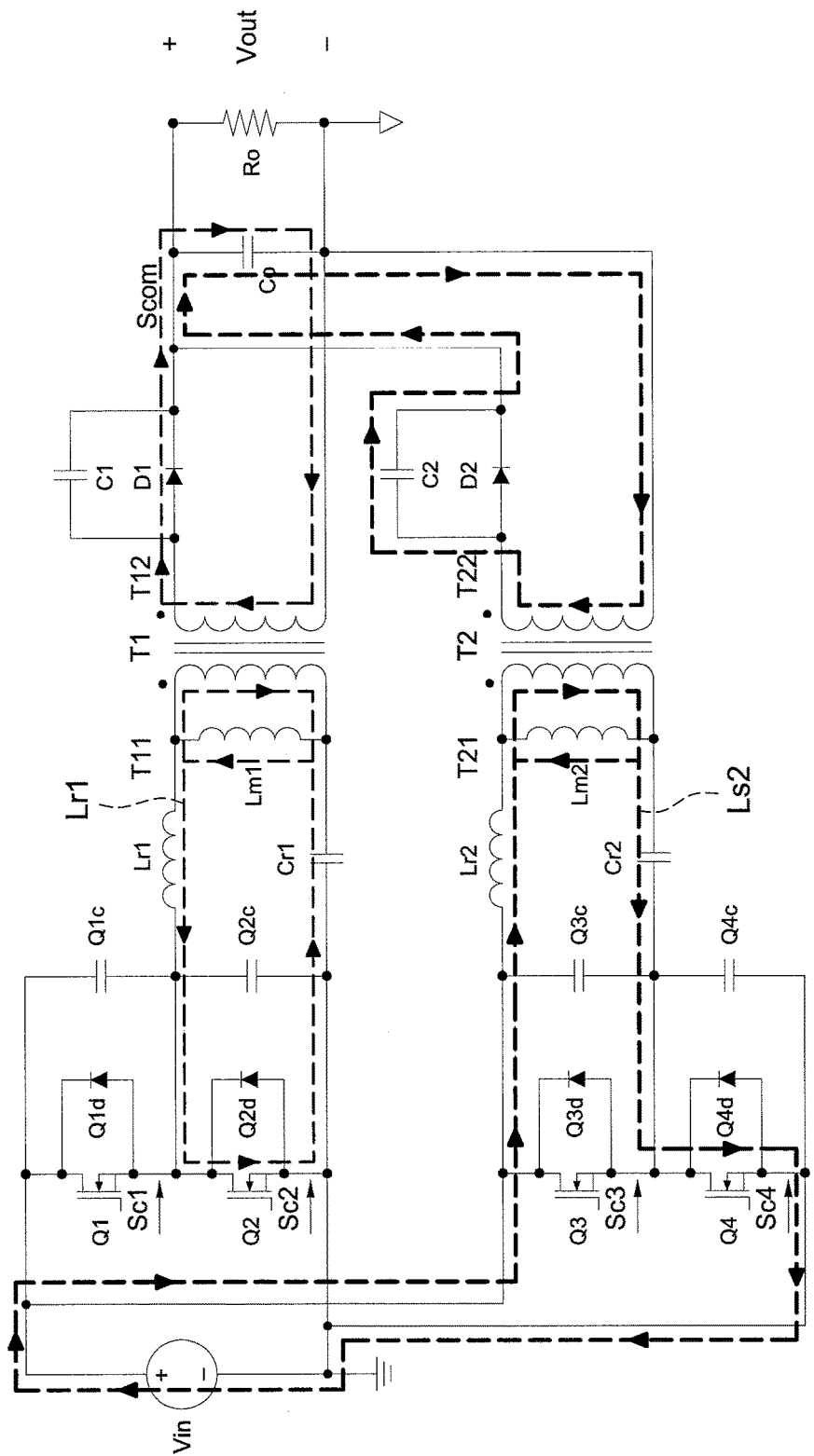
FIG. 7E is a circuit diagram of the resonant converter operating in a fifth state according to the present disclosure.

Please refer to FIG. 7E, which shows a circuit diagram of the resonant converter operating in a fifth state according to the present disclosure. Also, refer to a time interval t4-t5 shown in FIG. 6. In the fifth operation state, the second switch element Q2 and the fourth switch element Q4 are still turned on, and the first switch element Q1 and the third switch element Q3 are still turned off.

For the first resonant conversion circuit 10, the current flowing through the first resonant inductor ILr1 is zero at a time t4 and continuously reduced, and therefore the first semiconductor element D1 is continuously turned on due to a forward-bias voltage across the first semiconductor element D1. In the fifth operation state, the first resonant inductor Lr1 is in an energy-releasing state, and a first energy-releasing path Lr1 is labeled at the primary side of the first transformer. At this condition, the current flowing through the first resonant inductor ILr1 is from positive to negative. When the current flowing through the first magnetizing inductance ILm1 is equal to the current flowing through the first resonant inductor ILr1, the current flowing through the first semiconductor element ID1 is zero and therefore the first semiconductor element D1 is turned off and the fifth operation state is completed.

For the second resonant conversion circuit 20, the current flowing through the second resonant inductor ILr2 is from negative to positive at the time t4, and the fifth operation state starts. An input current flows from the fourth switch element Q4 to the second resonant inductor Lr2, and therefore the current flowing through the second resonant inductor ILr2 is increased in a sinusoidal form to make the second resonant inductor Lr2 store energy. Also, the current flowing through the second magnetizing inductance ILm2 is kept negative. At this condition, input energy is transferred from the primary side of the second magnetic conductive unit T2 (namely the second transformer) to the secondary side thereof, thereby charging the second energy-storing element C2 and increasing the voltage across the second energy-storing element VC2. In the fifth operation state, the second resonant inductor Lr2 is in an energy-storing state, and a second energy-storing path Ls2 is labeled at the primary side of the second transformer. Also, the current flowing through the second energy-storing element IC2 is proportional to a sum of the current flowing through the second resonant inductor ILr2 and the current flowing through the second magnetizing inductance ILm2. When the voltage across the second energy-storing element VC2 increased from negative to zero, namely a voltage across the second semiconductor element D2 is zero, the second semiconductor element D2 is turned on and the fifth operation state is completed.

Figure 7F:
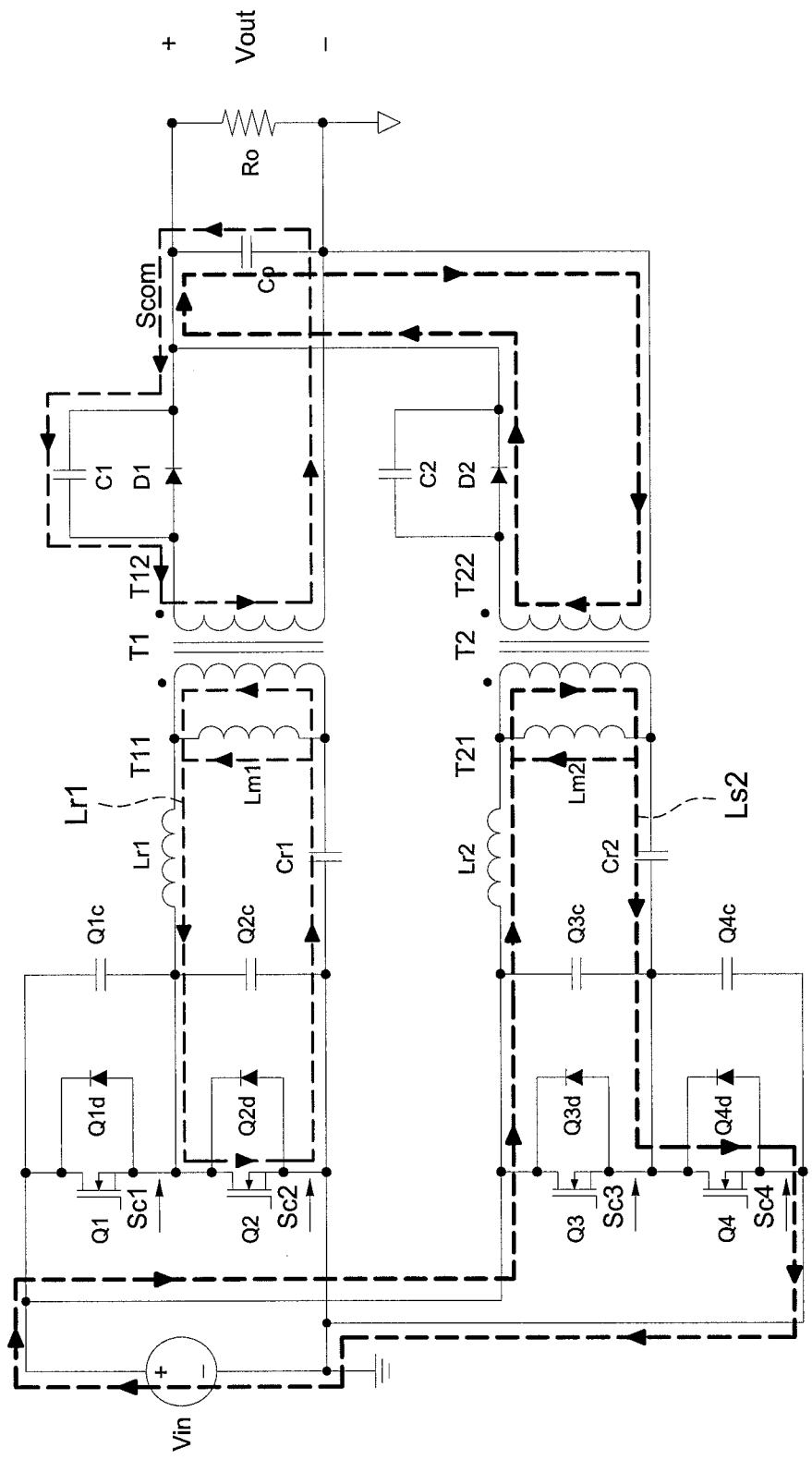
FIG. 7F is a circuit diagram of the resonant converter operating in a sixth state according to the present disclosure.

Please refer to FIG. 7F, which shows a circuit diagram of the resonant converter operating in a sixth state according to the present disclosure. Also, refer to a time interval t5-t6 shown in FIG. 6. In the sixth operation state, the second switch element Q2 and the fourth switch element Q4 are still turned on, and the first switch element Q1 and the third switch element Q3 are still turned off.

For the first resonant conversion circuit 10, the first energy-storing element C1 is discharged at a time t5, and therefore the voltage across the first energy-storing element VC1 is decreased. At this time, a resonance occurs among the first energy-storing element C1, the first resonant capacitor Cr1, and the first resonant inductor Lr1, and the current flowing through the first resonant inductor ILr1 is negative and continuously decreased. Until the second switch element Q2 is turned off, the sixth operation state is completed.

For the second resonant conversion circuit 20, the voltage across the second energy-storing element VC2 is charged to zero at the time 15, and therefore the second semiconductor element D2 is turned on due to a forward-bias voltage across the second semiconductor element D2. At this condition, the current flowing through the second resonant inductor ILr2 is continuously increased and a resonance occurs between the second resonant inductor Lr2 and the second resonant capacitor Cr2. Until the fourth switch element Q4 is turned off, the sixth operation state is completed.

Figure 7G:
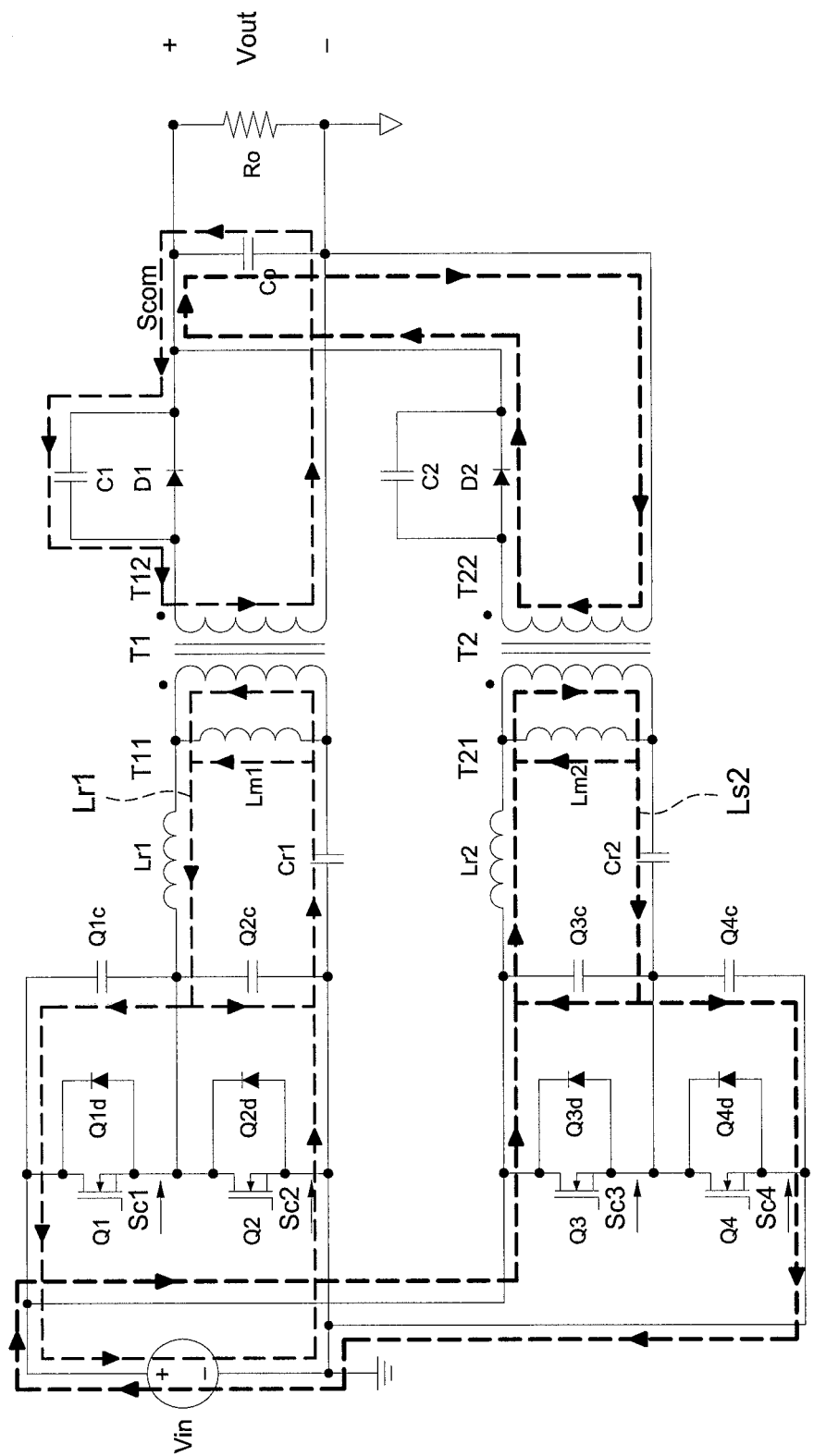
FIG. 7G is a circuit diagram of the resonant converter operating in a seventh state according to the present disclosure.

Please refer to FIG. 7G, which shows a circuit diagram of the resonant converter operating in a seventh state according to the present disclosure. Also, refer to a time interval t6-t7 shown in FIG. 6. In the seventh operation state, the first switch element Q1, the second switch element Q2, the third switch element Q3, and the fourth switch element Q4 are turned off.

For the first resonant conversion circuit 10, the current flowing through the first resonant inductor ILr1 is continuously decreased. In order to maintain the first resonant inductor Lr1 to be in the energy-releasing state, the current flowing through the first resonant inductor ILr1 flows through the second parasitic capacitance Q2c of the second switch element Q2 to charge the second parasitic capacitance Q2c. At the same time, the first parasitic capacitance Q1c of the first switch element Q1 discharges, and therefore the drain-source voltage Vds2 of the second switch element Q2 is increased. Until a voltage across the second parasitic capacitance Q2c is charged up to a voltage of the input power source Vin and a voltage across the first parasitic capacitance Q1c is discharged to zero, the seventh operation state is completed.

For the second resonant conversion circuit 20, the fourth switch element Q4 is turned off at a time t6, and the current flowing through the second resonant inductor ILr2, namely a resonant current is continuously increased. In order to maintain the second resonant inductor Lr2 to be in the energy-storing state, the current flowing through the second resonant inductor ILr2 flows through the fourth parasitic capacitance Q4c of the fourth switch element Q4 to charge the fourth parasitic capacitance Q4c. At the same lime, the third parasitic capacitance Q3c of the third switch element Q3 discharges, and therefore the drain-source voltage Vds3 of the third switch element Q3 is reduced. Until a voltage across the fourth parasitic capacitance Q4c is charged up to a voltage of the input power source Vin and a voltage across the third parasitic capacitance Q3c is discharged to zero, the seventh operation state is completed.

Figure 7H:
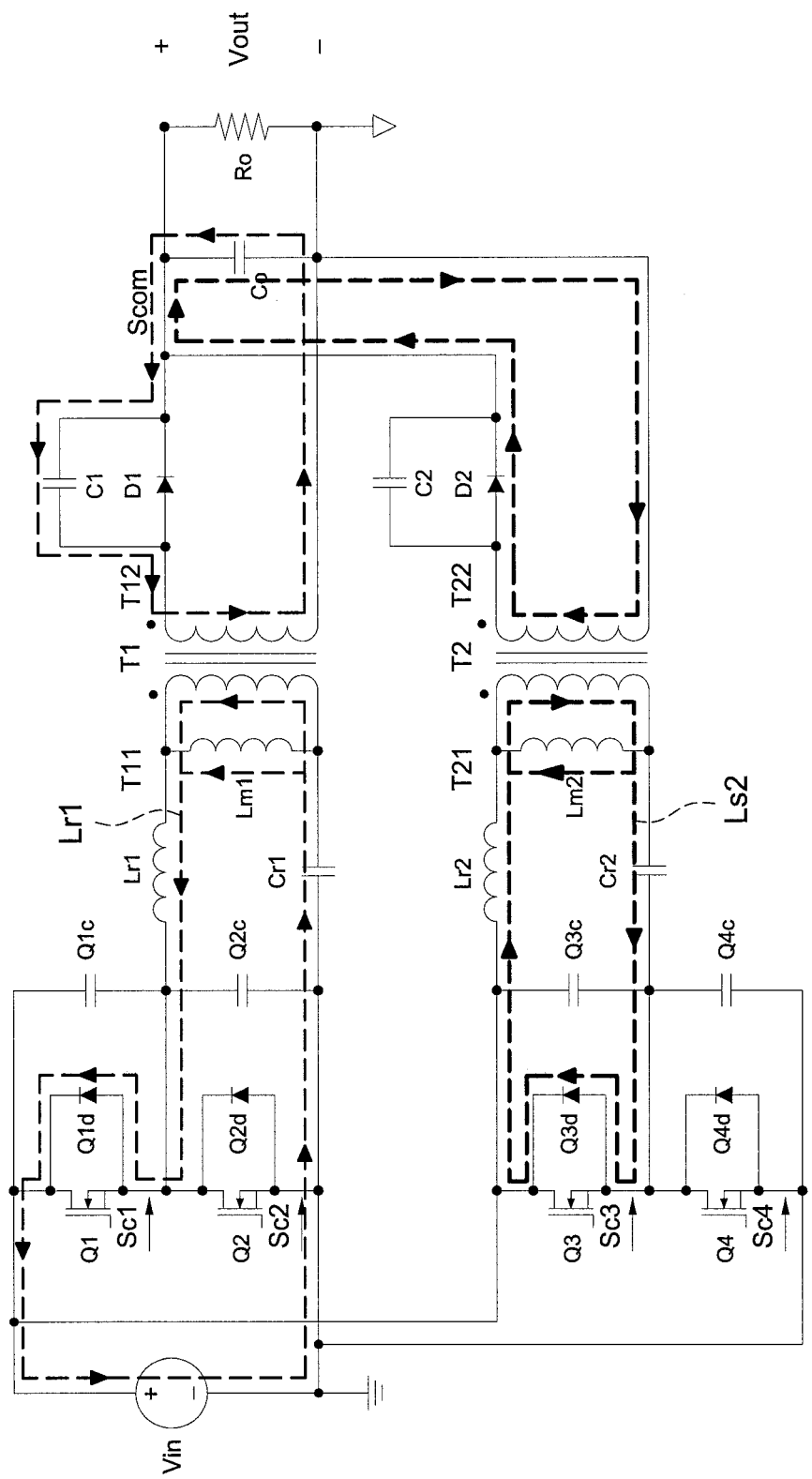
FIG. 7H is a circuit diagram of the resonant converter operating in an eighth state according to the present disclosure.

Please refer to FIG. 7H, which shows a circuit diagram of the resonant converter operating in an eighth state according to the present disclosure. Also, refer to a time interval t7-t8 shown in FIG. 6. In the beginning of the eighth operation state, the first switch element Q1, the second switch element Q2, the third switch element Q3, and the fourth switch element Q4 are turned off. During the eighth operation state, the first switch element Q1 and the third switch element Q3 are turned on, and the second switch element Q2 and the fourth switch element Q4 are still turned off, and therefore the drain-source voltage Vds1 of the first switch element Q1 and the drain-source voltage Vds3 of the third switch element Q3 are zero, and the drain-source voltage Vds2 of the second switch element Q2 and the drain-source voltage Vds4 of the fourth switch element Q4 are not zero.

For the first resonant conversion circuit 10, the current flowing through the first resonant inductor ILr1, namely the resonant current flows through the first body diode Q1d of the first switch element Q1 so as to maintain the first resonant inductor Lr1 to be in the energy-releasing state. At this time, the first switch element Q1 is appropriately switched to achieve a zero voltage switching (ZVS) operation, thereby effectively reducing the switching losses and increasing conversion efficiency of the resonant converter. When the current flowing through the first resonant inductor ILr1 is continuously increased to be equal to the current flowing through the first magnetizing inductance ILm1 at a time t7', the current flowing through the first energy-storing element IC1 is from negative to positive to charge the first energy-storing element C1. Until the current flowing through the first resonant inductor ILr1 increases from negative to zero, the eighth operation state is completed.

For the second resonant conversion circuit 20, when the drain-source voltage Vds3 of the third switch element Q3 reduces to zero, the current flowing through the second resonant inductor ILr2, namely the resonant current flows through the third body diode Q3d of the third switch element Q3 so as to maintain the second resonant inductor Lr2 to be in the energy-storing state. At this time, the third switch element Q3 is appropriately switched to achieve a zero voltage switching (ZVS) operation, thereby effectively reducing the switching losses and increasing conversion efficiency of the resonant converter. Until the current flowing through the second resonant inductor ILr2 reduces to zero, the eighth operation state is completed.

After the eighth operation state is completed, the operation state is returned to the first operation state and the subsequent operation states are repeated. Therefore, the repeated operation can be referred in the foregoing description and be omitted here for conciseness.

In conclusion, the present disclosure has following features and advantages:

1. The inherent characteristics of the circuit elements are utilized to coordinate with the corresponding control signals to achieve phase interleaving control between the two resonant conversion circuits without adding extra complicated PLL and its control circuits, thereby reducing circuit costs, simplifying circuit controls, and increasing the dynamic performance of phase controls.

2. In a light-loading condition, any one of the resonant conversion circuits can be easily selected to be decoupled by simple signal controls, thereby sufficiently supplying power to the load and reducing basic power consumption to significantly increase light-loading efficiency.

3. The accurate phase interleaving control is implemented to effectively reduce output ripples of the resonant conversion circuits, thereby reducing the capacity of the output capacitor and its size, increasing the stability of the feedback control, and contributing the use of products depending on the voltage precision.

4. The parallel-connected resonant conversion circuits are used to effectively reduce copper losses of magnetic elements and increase the conversion efficiency when the resonant converter is applied to high power applications.

5. The simple control manner is implemented to achieve a current-sharing function based on the main circuit elements which are extremely uniform.

6. The main circuit elements of the parallel-connected resonant conversion circuits are commonly used to reduce the number of circuit elements and reduce the process of circuit production.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A dual phase-shifted resonant converter without any phase-locked loop receiving an input power source, the dual phase-shifted resonant converter without any phase-locked loop comprising:
a first resonant conversion circuit comprising:
a first switching unit comprising a first switch element and a second switch element, wherein the first switch element is ungrounded coupled between the input power source and the second switch element, and the second switch element is grounded;
a first resonant tank coupled in parallel to the second switch element; and
a first rectifying unit coupled to the first resonant tank;
a second resonant conversion circuit, comprising:
a second switching unit comprising a third switch element and a fourth switch element, wherein the third switch element is ungrounded coupled between the input power source and the fourth switch element, and the fourth switch element is grounded;
a second resonant tank coupled in parallel to the third switch element; and
a second rectifying unit coupled to the second resonant tank; wherein an output side of the second rectifying unit is coupled to an output side of the first rectifying unit to form a common-connected output side;
a detection unit coupled to the common-connected output side and the detection unit configured to provide a detection signal;
an isolated transmission unit coupled to the detection unit and the isolated transmission unit configured to receive the detection signal and provide a feedback signal; and
a control unit configured to receive the feedback signal and control the first switching unit and the second switching unit according to the feedback signal;
wherein each of the first resonant tank and the second resonant tank comprising:
a resonant capacitor;
a resonant inductor; and
a magnetic conductive unit having a first side and a second side, wherein the first side is coupled in series to the resonant capacitor and the resonant inductor, and the second side is coupled in series to the first rectifying unit or the second rectifying unit;
wherein each of the first rectifying unit and the second rectifying unit comprising:
an energy-storing element coupled between the second side of the magnetic conductive unit and the common-connected output side; and
a semiconductor element coupled in parallel to the energy-storing element;
wherein the energy-storing element and the resonant capacitor form an equivalent resonant capacitor, and the equivalent resonant capacitor and the resonant inductor determine resonant parameters of the first resonant tank and the second resonant tank;
wherein the energy-storing element is a physical capacitor rather than a parasitic capacitance of the semiconductor element.

2. The dual phase-shifted resonant converter without any phase-locked loop in claim 1, wherein the first side of the magnetic conductive unit has two ends;
wherein the resonant capacitor and the resonant inductor are coupled to different ends of the first side of the magnetic conductive unit to form a series-connected circuit structure; the series-connected circuit structure is coupled in parallel to the second switch element or the third switch element.

3. The dual phase-shifted resonant converter without any phase-locked loop in claim 1, wherein the first side of the magnetic conductive unit has two ends including a first end and a second end;
wherein the resonant capacitor is coupled to the resonant inductor, and then coupled to the first end or the second end of the first side of the magnetic conductive unit to form a series-connected circuit structure; the series-connected circuit structure is coupled in parallel to the second switch element or the third switch element.

4. The dual phase-shifted resonant converter without any phase-locked loop in claim 1, wherein the detection unit comprises:
- a detection resistor coupled to the common-connected output side and the detection resistor configured to detect a current flowing through the common-connected output side; and
- a calculation unit coupled in parallel to the detection resistor, and the calculation unit configured to receive voltage values at two ends of the detection resistor and provide the detection signal by calculating the voltage values.

5. The dual phase-shifted resonant converter without any phase-locked loop in claim 4, wherein the isolated transmission unit is configured to receive the detection signal provided from the detection unit to provide the feedback signal; the control unit is configured to simultaneously turn off the first switch element and the second switch element to decouple the first resonant conversion circuit or simultaneously turn off the third switch element and the fourth switch element to decouple the second resonant conversion circuit according to the feedback signal.

6. The dual phase-shifted resonant converter without any phase-locked loop in claim 4, further comprising:
- a fifth switch element coupled between the input power source and the first switch element; and
- a sixth switch element coupled between the input power source and the third switch element;
- wherein the isolated transmission unit is configured to receive the detection signal provided from the detection unit to provide the feedback signal; the control unit is configured to turn off the fifth switch element to decouple the first resonant conversion circuit or turn off the sixth switch element to decouple the second resonant conversion circuit according to the feedback signal.

7. The dual phase-shifted resonant converter without any phase-locked loop in claim 5, wherein the detection signal is a voltage signal or a current signal.

8. The dual phase-shifted resonant converter without any phase-locked loop in claim 6, wherein the detection signal is a voltage signal or a current signal.

* * * * *